United States Patent Office 3,408,555
Patented Oct. 29, 1968

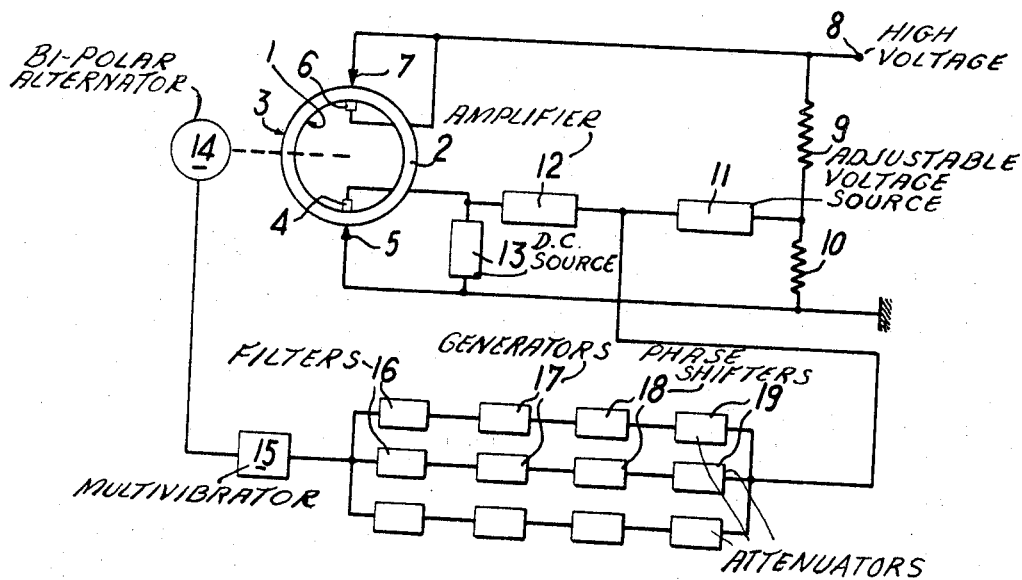

3,408,555
METHOD AND DEVICE FOR STABILIZING ELECTROSTATIC GENERATORS
Charles Fremiot and Robert Gerbier, Grenoble, France, assignors to Commissariat a l'Energie Atomique, Paris, France
Filed Apr. 4, 1966, Ser. No. 540,076
Claims priority, application France, Apr. 20, 1965, 13,758
4 Claims. (Cl. 322—2)

ABSTRACT OF THE DISCLOSURE

Electrostatic generators producing an output voltage including a periodical modulation voltage are stabilized by superimposing on the output voltage an adjustment voltage similar to the periodical modulation voltage but of opposite sign provided by a source synchronized with the periodical modulation voltage.

---

The present invention relates to a method for stabilizing electrostatic generators and to a device for carrying out said method.

Several types of electrostatic generators are known: those of the insulating cylinder type comprise two cylinders, viz. one so-called rotor cylinder made of a high dielectric constant material rotating about a so-called stator cylinder.

Electric charges are caused to form a deposit on the rotor due to the application of a so-called energizing voltage between two electrodes, one of which contacts the stator while the other is located in the vicinity of the rotor and is intended to ionize the surrounding air, such electrodes being referred to as the inductor and the ionizer, respectively.

Said electric charges are collected by two other electrodes respectively similar to the latter and connected to the positive terminal of a high-voltage generator. Thus, between said positive terminal and the earth, is provided an electric source which is characterized, for any given energization, by a substantially constant current and by a voltage limited only by the load impedance and by the extent to which the high-voltage terminal can be insulated.

In electrostatic generators of the belt type, the electric charges deposited on an insulating belt by means of a voltage applied between two energizing electrodes are transferred by said belt; the voltage and current characteristics of the thus formed electric source are identical to those corresponding to the insulating cylinder generator.

When it is desired to use an electrostatic generator as a source of D.C. voltage, it is necessary to provide it with a regulating device intended to cause the current to vary in the opposite direction to the load impedance. This can be achieved, according to the prior art, in particular as regards electrostatic generators of the insulating cylinder type, by extracting a portion of the generator output voltage by means of a potentiometer and by feeding the input of an amplifier with a so-called regulating signal which is the algebraic sum of said voltage portion and of a so-called reference voltage. The amplifier delivers a voltage which, added to a fixed voltage supplied by an external source, constitutes the generator energizing voltage. Said amplifier is so designed that any variation of the generator output voltage produces a variation of the energizing voltage in the opposite direction, which tends to restore said output voltage to its regulated value.

In such a regulating device of the prior art, which goes by the name of moderately stable device, the phase-shift due to the generator may lead to disturbances, and, in fact, the relative instability, viz the ratio of the maximum variation of the output voltage to the average regulated voltage is of about 1/100.

It is known to improve such a regulating device by means of a two-way system in which the regulating signal is applied to the energization, on the one hand, and to the high-voltage output, on the other hand, through the medium of a capacitor. With such a so-called high-stable system it is possible to achieve a relative instability of about 1/10,000, but in that case it is necessary to use capacitors able to sustain the whole output voltage and, therefore, very costly.

In the moderately stable device the residual vibration $U_t$ of the output voltage is the resultant of three superimposed voltages, viz.:

(1) $U_m$, which is the modulation (usually non-periodical) provided by the variations of the load impedance;

(2) $U_p$, which is the periodical voltage due in particular to mechanical defects at the rotor; and (3) $U_i$, corresponding to the noise due to an uneven ionization by ionizers; $U_i$ is equal to about $U_p/100$ while $U_m$ is of about $U_p/10$.

The present invention relates to a method whereby is obtained in a moderately stable device, by reducing $U_p$ to one tenth of its value, a relative instability of one thousandth, a value which is advantageous in many applications and is free of the drawbacks of highly stable devices.

More precisely, the object of the present invention is a method for stabilizing electrostatic generators delivering an output voltage which comprises a periodical modulation voltage, said method consisting in superimposing on said output voltage an adjustment voltage of substantially same shape, frequency and amplitude as said periodical modulation voltage but of opposite phase, said adjustment voltage being provided by a source of periodical voltage synchronized with said periodical modulation voltage.

Another object of the present invention is to provide a device applicable to an electrostatic generator which delivers an output voltage comprising a periodical modulation voltage, said device comprising a periodical voltage generator mechanically coupled to said electrostatic generator and adapted to deliver a voltage having the same frequency as said periodical modulation voltage, means for generating a periodical voltage comprising harmonics of said modulation voltage, and at least two circuits in parallel, each of said circuits comprising a filter tuned to a given frequency which is a harmonic of said modulation voltage, a phase-shifting device and an attenuator.

The features of the present invention will be disclosed hereafter, reference being made to the accompanying figure in which is shown the device for regulating an electrostatic generator.

This generator which is of the insulating cylinder bipolar type is formed of a cylindrical stator 1 and of a rotor 2 coaxial with, and of the same shape as, said stator and separated from the latter by a thin gap 3. It comprises two energizing electrodes. viz. an inductor 4 and an ionizer 5 and two load collecting electrodes, viz, an inductor 6 and an ionizer 7, connected to high voltage terminal 8. Between said terminal and the earth are mounted two resistors 9 and 10 which constitute a potentiometer, the junction point of which is connected to an adjustable voltage source 11. The output of this source is connected to the input of an amplifier 12, the output voltage of which is superimposed to the voltage of a D.C. source 13 and applied between ionizer 5 and inductor 4. The shaft of the generator rotor drives the rotor of a small bi-polar alternator 14. The output of the latter is connected to a multivibrator 15, at the output of which the circuit divides into three branches each of which comprises a filter 16, a synchronized generator 17, a phase-shifter 18 and an attenuator 19. Then, said three branches meet again into a single line connected to the input of amplifier 12.

The device according to the invention operates as follows:

Alternator 14 delivers a voltage, the frequency of which is that of the periodical voltage $U_p$ arising from the mechanical defects of rotor 2. Said alternator sets in motion multivibrator 15 which delivers a rectangular voltage signal having the frequency $U_p$. The latter voltage, which contains many harmonics is applied to the input of the above three branches, each of which comprises a filter 16 tuned to the frequencies of the fundamental and of the first two harmonics of $U_p$. In each of these branches, selective filter 16 is connected to a synchronized generator 17 which delivers a purely sinusoidal signal. Each of the three thus obtained voltages is then phase-shifted in an adjustable phase-shifter 18 and its amplitude is adjusted by an attenuator 19, also adjustable.

The sum of these three voltages is applied to the input of amplifier 12 and is superimposed on the regulating signal; it is amplified by amplifier 12 and by the electrostatic generator itself and provides a modulation voltage which is substantially equal to $U_p$ (and of opposite sign) at the output, the amplitude of harmonics beyond three being negligible in the present case. Thus, the amplitude of $U_p$ and, therefore, the relative instability can be divided by ten.

The device is independently adjusted in each of the three branches: the phase-shifter 18 and the attenuator 19 of each branch are so regulated as to provide the maximum attenuation of the harmonic corresponding to the respective branch, on an oscilloscope (not shown) which is mounted in parallel with resistor 10, for instance. It is to be noted that the above adjustment is valid for a given value of the regulation voltage $U_i$ but it can however be carried out automatically.

Multivibrator 15 is of the coupled-cathode type and filters 16 are of the T type.

The method according to the invention also applies to the stabilization of a generator feeding a load which varies owing to extraneous causes; under such circumstances the correction must be synchronized with these causes.

It is to be noted that the device according to the invention comprises no closed servomechanism loop, since the correcting signal is independent of the output signal.

What is claimed is:
1. A method for stabilizing an electrostatic generator which delivers an output voltage including a periodical modulation voltage, said method comprising the steps of producing a voltage having the same frequency as said modulation voltage by means of a source synchronized with said modulation voltage, transforming the voltage thus delivered by said source into a correction voltage having the same shape, frequency and amplitude as said modulation voltage but of opposite phase, and superimposing said correction voltage on said output voltage of the electrostatic generator.

2. A method for stabilizing an electrostatic generator which delivers an output voltage including a periodical modulation voltage, said method comprising the steps of producing a voltage having the same frequency as said modulation voltage by means of a source synchronized with said modulation voltage, decomposing the voltage thus delivered by said source into harmonics, separately filtering, phase-shifting and amplitude regulating said harmonics, re-grouping said thus amplitude regulated harmonics into a single signal, and superimposing said single signal on said output voltage of the electrostatic generator.

3. A device for stabilizing an electrostatic generator which delivers an output voltage including a periodical modulation voltage, said device comprising a periodical voltage generator mechanically coupled to said electrostatic generator, said periodical voltage generator delivering a voltage having the same frequency as said modulation voltage, and means for transforming the voltage thus delivered by said periodical voltage generator into a correction voltage having the same shape, frequency and amplitude as said modulation voltage but of opposite phase.

4. A device for stabilizing an electrostatic generator which delivers an output voltage including a periodical modulation voltage, said device comprising a periodical voltage generator mechanically coupled to said electrostatic generator, said periodical voltage generator delivering a voltage having the same frequency as said modulation voltage, means operated by said periodical voltage generator and generating a rectangular signal having the same frequency as said modulation voltage and comprising harmonics of said modulation voltage, at least two circuits mounted in parallel and each of which comprises a filter tuned to one of said harmonics, an adjustable phase-shifter and an adjustable attenuator, and means for regrouping the signals delivered by said attenuators into a single signal having the same shape, frequency and amplitude as said modulation voltage but of opposite phase.

References Cited

UNITED STATES PATENTS 2,588,613   3/1952   Burrill et al. _____ 322—2

ORIS L. RADER, *Primary Examiner.*

H. HUBERFELD, *Assistant Examiner.*